US012616234B2

(12) United States Patent
Morend et al.

(10) Patent No.: US 12,616,234 B2
(45) Date of Patent: May 5, 2026

(54) METHOD FOR DRYING A SMOKE FILTER UNIT

(71) Applicant: SOCIETE DES PRODUITS NESTLE S.A., Vevey (CH)

(72) Inventors: Joel Morend, Chatonnaye (CH); Riste Pindjurov, Neyruz (CH); Flavien Florent Dubief, Champagne (CH); Daniel Roland Manser, Spiez (CH)

(73) Assignee: Societe des Produits Nestle S.A., Vevey (CH)

( * ) Notice: Subject to any disclaimer, the term of this patent is extended or adjusted under 35 U.S.C. 154(b) by 982 days.

(21) Appl. No.: 17/757,091

(22) PCT Filed: Dec. 14, 2020

(86) PCT No.: PCT/EP2020/085891
§ 371 (c)(1),
(2) Date: Jun. 9, 2022

(87) PCT Pub. No.: WO2021/116484
PCT Pub. Date: Jun. 17, 2021

(65) Prior Publication Data
US 2023/0041569 A1 Feb. 9, 2023

(30) Foreign Application Priority Data
Dec. 13, 2019 (EP) ..................................... 19216321

(51) Int. Cl.
*A23F 5/04* (2006.01)
*A23N 12/00* (2006.01)
(Continued)

(52) U.S. Cl.
CPC .............. *A23N 12/125* (2013.01); *A23F 5/04* (2013.01); *B01D 39/12* (2013.01);
(Continued)

(58) Field of Classification Search
CPC ...... A23N 12/00; A23N 12/125; A23N 12/08; A23N 12/06; A23N 12/83; A23F 5/04;
(Continued)

(56) References Cited

U.S. PATENT DOCUMENTS

2009/0130277 A1 5/2009 Bressner et al.
2017/0013870 A1* 1/2017 Hsiao ..................... A23N 12/12
(Continued)

FOREIGN PATENT DOCUMENTS

CA 2595225 A1 8/2006
CN 2555641 Y 6/2003
(Continued)

OTHER PUBLICATIONS

English translation of JP2000210588 by PE2E Aug. 4, 2025.*
(Continued)

*Primary Examiner* — Deming Wan
(74) *Attorney, Agent, or Firm* — K&L Gates LLP

(57) ABSTRACT

The invention concerns a method for drying at least one cell of the electrostatic precipitator of a smoke treating unit in a system of a coffee beans roasting apparatus and a smoke treating unit, said method comprising the step of passing hot air through said cell, while said cell is positioned inside the electrostatic precipitator and while said cell is switched off.

8 Claims, 3 Drawing Sheets

(51) Int. Cl.

| | |
|---|---|
| *A23N 12/12* | (2006.01) |
| *B01D 39/12* | (2006.01) |
| *B01D 39/20* | (2006.01) |
| *B01D 46/00* | (2022.01) |
| *B01D 53/32* | (2006.01) |
| *B03C 3/017* | (2006.01) |
| *B03C 3/41* | (2006.01) |
| *B03C 3/45* | (2006.01) |
| *B03C 3/78* | (2006.01) |

(52) U.S. Cl.
CPC ..... *B01D 39/2055* (2013.01); *B01D 46/0032* (2013.01); *B01D 46/0036* (2013.01); *B01D 53/323* (2013.01); *B03C 3/017* (2013.01); *B03C 3/41* (2013.01); *B03C 3/45* (2013.01); *B03C 3/78* (2013.01); *B03C 2201/04* (2013.01)

(58) Field of Classification Search
CPC ................ B01D 39/12; B01D 46/0032; B01D 46/0036; B01D 53/323; B03C 3/017; B03C 3/41; B03C 3/45
USPC .................................... 34/360, 250; 219/429
See application file for complete search history.

(56) References Cited

U.S. PATENT DOCUMENTS

| | | | |
|---|---|---|---|
| 2018/0071751 A1 | 3/2018 | Voronin et al. | |
| 2018/0255802 A1* | 9/2018 | Yamamoto ............... | A23F 5/04 |

FOREIGN PATENT DOCUMENTS

| | | | | | |
|---|---|---|---|---|---|
| CN | 2855104 | Y | 1/2007 | | |
| CN | 105768141 | A | 7/2016 | | |
| EP | 0055462 | A1 | 7/1982 | | |
| EP | 0925838 | | 6/1999 | | |
| JP | S5215069 | U | 2/1977 | | |
| JP | H0417841 | U | 2/1992 | | |
| JP | H08108093 | A | 4/1996 | | |
| JP | H11151453 | A | 6/1999 | | |
| JP | H11226451 | A | 8/1999 | | |
| JP | 2000210588 | A | * | 8/2000 | .............. A47J 37/00 |
| JP | 2001096192 | A | | 4/2001 | |
| JP | 2008142670 | A | * | 6/2008 | .............. B03C 3/68 |
| JP | 2011110483 | A | | 6/2011 | |
| JP | 2013177863 | A | | 9/2013 | |
| KR | 101306992 | | | 9/2013 | |
| RU | 2017117550 | A | | 11/2018 | |
| TW | M297162 | U | | 9/2006 | |
| WO | 9831974 | | | 7/1998 | |

OTHER PUBLICATIONS

English translation of JP2008142670 by PE2E /84/25.*
Chinese Office Action for Chinese Appl No. 202080085455.1 dated Jun. 15, 2023.
Japanese Office Action for Appl No. 2022-534759 dated Mar. 11, 2025, 5 pages.
Russian Office Action for Russian Appl No. 2022117036/10 dated Apr. 15, 2024, 7 pages.
Japanese Office Action for Appl No. 2022-534759 dated Nov. 19, 2024, 7 pages.

* cited by examiner

222a

222b

2

24

A2

A

21

211

212

A3

11

A1

1

METHOD FOR DRYING A SMOKE FILTER UNIT

CROSS REFERENCE TO RELATED APPLICATIONS

The present application is a National Stage of International Application No. PCT/EP2020/085891, filed on Dec. 14, 2020, which claims priority to European Patent Application No. 19216321.0, filed on Dec. 13, 2019, the entire contents of which are being incorporated herein by reference.

FIELD OF THE INVENTION

The present invention relates to apparatuses for roasting coffee beans in a safe environment.

BACKGROUND OF THE INVENTION

The roasting of coffee beans is a well-known process. The main steps consists in heating the beans to a desired roasting level and then cooling or quenching the heated beans to stop the roasting. During heating, smoke is emitted. This smoke contains safe and desired components all together, in particular the usual roasted coffee aroma, but also undesired less safe volatile organic compounds (VOC) VOC such as pyridine, 2-furane methanol, caffeine furfural, formaldehyde, acetaldehyde, . . . and particulate matter ($PM_{25}$, $PM_{10}$), . . . .

When roasting is implemented in manufacturing places producing important quantities of roasted beans, generally all the conditions for catching unsafe components are supplied.

But, there is a recent trend to implement small batch roasting with small roasters in shops, restaurants and coffees where customers are able to consume coffee brewed from freshly roasted beans. The roaster does not only provide freshness and theater advantages, but also dispenses the pleasant roasted coffee aroma inside the shop or coffee.

Yet, as mentioned above, harmful components are emitted too. When the roaster is used in a closed environment like a shop, coffee or restaurant, the emission of some components can become harmful depending on the size of the room, the ventilation of the room, . . . . For people working several hours in the room, smelling the smokes of the roaster can lead to a health problem.

As a result, in such an environment, it is recommended to stop the emission of smoke from the roaster to avoid any healthy issue for people present in the shop. The existing solutions consist in destroying contaminants, such as an afterburner enabling thermal oxidation of contaminants or a catalytic afterburner or retaining contaminants inside the apparatus like mechanical filters (metallic sieves or paper filter), an active carbon filter or an electrostatic precipitator or combination thereof.

An electrostatic precipitator catches some PM. The advantages of an electrostatic precipitator is its low cost of purchase and use, the absence of noise or heat generated during its use. Since, the electrostatic precipitator traps the contaminants that remain attached to the electrified cell of the electrostatic precipitator, the apparatus must be regularly cleaned. The cleaning operation consists in removing the cells of the electrostatic precipitator from the filter device and washing them with water and optionally with a detergent. Then the cells need to dry before being reinstalled inside the filter unit otherwise water drop creates breakdown in the filter device when it is operated. Since even very small drops of water create malfunction of the cells, it is essential that the cells are well dried before being re-installed. For this reason, drying of the cells requires a sufficient time. Generally a period of 12 hours is necessary. The operator can wash the cells at the end of the day and get them dried the next morning.

This period of drying is not a problem when the roasting apparatus and its associated filter are used once in a day or occasionally, but with the recent trend to use small roasters in shops, restaurants and coffees, roasting operations can happen frequently during the opening hours and the need for cleaning the smoke filter device can happen urgently during the opening hours. In that case, the length of the cleaning becomes incompatible with the high rate of use of the roaster and the filter device.

An object of the invention is to address the problem of enabling the cleaning of the unit treating the smoke resulting from coffee beans roasting and comprising an electrostatic precipitator in a short period of time.

SUMMARY OF THE INVENTION

In a first aspect of the invention, there is provided a method to dry at least one wet removable cell of an electrostatic precipitation smoke filter of a smoke treating unit (3) in a roasting system, said system comprising:
- a roasting apparatus, and
- a smoke treating unit configured to treat the smoke produced by the roasting apparatus, said smoke treating unit comprising said electrostatic precipitation smoke filter,
- said electrostatic precipitation smoke filter comprising said least one removable cell, and
- said cell comprising ionization wires, collecting electrodes and repelling electrodes, and
- said cell being supplied with electrical power,
- wherein the method comprises at least the step of passing hot air through said wet removable cell, while said cell is positioned inside the electrostatic precipitator and while said cell is switched off, and
- wherein said hot air is generated by the coffee beans roasting apparatus while the roasting chamber of said apparatus is empty, in particular void of coffee beans.

The method relates to the drying of the cell(s) of the electrostatic precipitator used in a system of comprising two apparatuses: first, a roasting apparatus in which beans can be heated to be roasted and, secondly, a smoke treating unit configured to treat the smoke generated inside the first roasting apparatus during the roasting of the coffee beans, said smoke treating unit comprising at least an electrostatic precipitator.

The two apparatuses can be sub-parts of one single main system or alternatively, the two apparatuses can be conceived as separated modules cooperating together during the process of roasting.

An electrostatic precipitator is a particulate collection device that filters a smoke by removing particles from the smoke stream using an electrostatic charge. The electrostatic precipitation smoke filter comprises one or more cells. Each cell is identical and comprises:
- ionization or corona metal wires in an upstream ionization area, and
- collecting electrodes and repelling electrodes in a downstream collecting area. Usually the electrodes presents the form of plates. An electrical field is generated through the electrodes and perpendicular to the flow of the smoke. Several couples of a collecting plate and a repelling plate spaced apart from each other can be associated and allow the smoke to flow in the spaces there between.

Usually the ionization wires are supplied with electrical power in order to apply a high voltage V to the ionization wires. Particles of the smoke flowing through said ionization area become ionised that is charges either positively or negatively.

Then when the stream of smoke passes through the downstream metal plates, the collecting electrodes become a collector of ionised particles: the charged particles are attracted to and move towards the plates and form a layer that stays on the plates. The exiting smoke stream is thus cleaned from the charged particles that have collected on the collecting electrodes. Electrostatic precipitators can be used to trap particles presenting size comprised between 1.0 and 10 μm.

After a certain time, the electrodes or plates need to be cleaned. The cleaning operation consists in removing the cell of associated wires and plates from the electrostatic precipitator device and washing them with water, eventually with a detergent, or putting them in a dishwasher, and draining them before introducing them back inside the electrostatic precipitator device.

Usually, the cell is not introduced back inside the device immediately after draining because it is still wet and wet wires and plates do not enable the operation of the electrostatic precipitator device. Yet, in the present method, the at least one cell is introduced back in the electrostatic precipitator device in order to implement a dry-in-place operation.

The drying of the at least one cell is obtained by passing hot air through said cell, while said cell is positioned inside the electrostatic precipitator and while said cell is switched off.

Although the cell is positioned inside the electrostatic precipitator, the fact that the cell is switched off—that is not connected to electric power—enables drying without risk of short-circuits.

The hot air is generated by a coffee beans roasting apparatus while the roasting chamber of said apparatus is empty, in particular void of coffee beans.

Accordingly, the roasting apparatus is used to dry the cell by generating a flow of hot air void of contaminants. This hot air evaporates water drops remaining on the cell without depositing particles on them.

In one embodiment, the method can comprise a step of verifying the absence of beans inside the roasting chamber before drying the cell. For example, a pressure sensor or a temperature sensor can be used to detect the presence of beans while the heating operation begins (difference in air drop and absorption of heat by beans respectively).

This method enables a considerable reduction of the time necessary to clean and then dry the at least one cell: the operation of drying can be reduced to less than one hour, even less than 30 minutes meaning that the non-operational state of the roasting apparatus become far less critical for the operator.

The method can be implemented in a manual mode by the operator actuating the roasting apparatus without introducing beans inside the roasting chamber and introducing the produced hot air inside the smoke filtering unit during a certain time, while keeping the electrostatic precipitator switched off. Operating this method during about 30 minutes is usually sufficient to dry the cell of the electrostatic precipitator.

The temperature of the hot air generated by the coffee beans roasting apparatus is usually superior to 100° C. to enable humidity evaporation. Too high temperatures can reduce the time for drying but can also increase the time for cooling the roasting apparatus before it can be used again. Optimal temperature can depend on the type of roasting apparatus (property to cool down rapidly or not) and the smoke filtering unit (some of its sub-units may be damaged by high temperature).

A temperature of 200° C. at the roasting apparatus can generate a flow of hot air at about 60° C. inside the electrostatic precipitator which is sufficient for a rapid drying of the cell(s) of the electrostatic precipitator.

Preferably, the method is implemented in an automatic mode. The mode is defined to assist the operator and enable a drying operation as short as possible, in particular shorter than 30 minutes.

Preferably, while passing hot air through the at least one cell of the electrostatic precipitator, the method can comprise the steps of:

S1—keeping the cell of the electrostatic precipitator switched off during one first pre-determined period, then, then S2—at the end of said first pre-determined period, electrically switching on said cell, and if short-circuit is detected during a second pre-determined period, implementing steps S1 and S2 again, if no short-circuit is detected during the second pre-determined period, finishing the operation of passing air through the cell.

The first pre-determined period of step S1 is set to enable a sufficient time of drying during step S1. This time can be pre-determined for each type of system and depends on each specific configuration like the type of electrostatic precipitator (internal design of rows and plates inside the cell), number of cells in the electrostatic precipitator, length of the path of air in the smoke treating unit, type of roasting apparatus, type of cleaning (manual or dishwasher with partial drying cycle). Generally for a small system dimensioned for a shop or restaurant, a time of at about 5 minutes can be defined.

In step S2, by switching on the cell, any short-circuit detected during the second pre-determined period is sufficient to confirm that the drying is not complete and that step S1 must be started again. This second pre-determined period can be relatively short, for example in the order of about 5 to 15 seconds.

When the electrostatic precipitator comprises several cells then, during step S2, each cell can be successively switched on in order to detect short circuits on at least one cell. If short-circuit is detected on at least one cell, step S1 must be operated again.

In another embodiment, the cells can be switched on simultaneously.

Here by several, it is meant more than one.

In one embodiment, if no short-circuit is detected during step S2, a checking step S3 is implemented during a pre-determined checking period before finishing the operation of passing air through the cell, and during said checking step S3, hot air is passed through the cell of the electrostatic precipitator while said cell is switched on, and if at least one short-circuit is detected during step S3, steps S1 and/or S2 are implemented again.

This checking step S3 is an additional checking of the effective drying of the cell. It reproduces step S2 during a longer period of time. The pre-determined checking period can depend on the configuration of the system, usually a period of about 1 or 2 minutes is sufficient.

Drying operation can be finished when no short-circuit is detected for each cell.

The step of finishing the operation of passing air through the cell usually comprises the step of passing cooling air through the cell. This step aims to decrease the temperature of the smoke treating unit globally and the temperature of the coffee roasting apparatus that has generated the hot air. By this last step, the two parts of the system become operable again. Depending on the type of filtering components, the smoke treating unit is made of, it may be essential to keep this unit in a specific range of temperature during its use. For example, if the smoke treating unit comprises an active carbon filter, generally this filter is optimally operational at a temperature of at most 65° C. If the drying operation of the cell of the electrostatic precipitator has increased the temperature of the smoke treating close to this limit, then the temperature inside the smoke treating unit and particularly at the active carbon filter must be decreased before any new filtering operation.

Similarly, to enable the roasting of a new batch of beans inside the roasting apparatus, the temperature in the roasting apparatus must be in a range of temperature not too high above ambient temperature. Depending on the temperature of the hot air generated during the drying operation of the cell of the electrostatic precipitator (generally sufficiently high to enable rapid evaporation of water in the cell), the cooling of the roasting apparatus is necessary.

Cooling is obtained by stopping the heating inside the roasting apparatus and driving ambient air through the roasting chamber and through the smoke treating unit.

In one embodiment, the smoke treating unit can comprise an active carbon filter and/or at least one metallic mesh filter.

When the smoke treating unit comprises such filters in addition to the electrostatic precipitator, the method presents the advantage of heating said additional filters during the drying operation of the cell of the electrostatic precipitator.

Since metallic mesh filters are cleaned in a similar way to the cell of the electrostatic precipitator (water washing, draining and drying), the present drying-in-place method applies to them too: the metallic mesh filters can be positioned back inside the smoke treating unit just after washing and dried by the flow of hot air introduced inside the smoke treating unit simultaneously to the cell of the electrostatic precipitator.

As for the active carbon filter, it has been observed that the efficiency of this filter diminishes if it holds some humidity. Accordingly, during the drying of the cell of the electrostatic precipitator, the active carbon filter can be kept inside the smoke treating unit, hot air eliminating potential humidity in said filter and improving the filtering efficiency of said filter during subsequent use.

Preferably, if the smoke treating unit comprises an active carbon filter, then hot air is passed through the cell of the electrostatic precipitator while keeping the temperature of the active carbon filter at at most 65° C.

As mentioned above, such a filter may be damaged if its temperature bypasses 65° C.

Preferably, the time length of the operation for drying the at least one cell of the electrostatic precipitator and/or the temperature of the hot air during said operation are set to avoid a too important temperature in the chamber of the roasting apparatus.

Usually controlling this temperature prevents too long cooling of the roasting apparatus during the finishing operation. Yet, this value may depend from the type of roasting apparatus used.

In a second aspect there is provided a system of a coffee beans roasting apparatus and a smoke treating unit, wherein said smoke treating unit comprises a smoke driver and at least an electrostatic precipitator, said electrostatic precipitator comprising at least one removable cell of associated rows and plates, and wherein said coffee beans apparatus comprises a heating device, and wherein said system comprises a control system operable to control:

the heating device of the roasting apparatus, the smoke driver of the smoke treating unit, and the electrical switching of the at least one cell of the electrostatic precipitator, wherein the control system is configured to implement the above method to dry the at least one removable cell of the electrostatic precipitator.

Generally, each of the roasting apparatus and the smoke filtering unit comprises a control system and the control systems can be connected to operate at least the drying mode.

In one preferred embodiment of the system, the control system of the smoke treating can be connected to the control system of the roasting apparatus, the control system of the roasting apparatus being the master and the control system of the smoke treating unit being the slave.

In the drying mode, the control system is configured:

to control the heating device of the roasting apparatus to produce hot air, and to control the smoke driver of the smoke filtering unit to pass said hot air through the at least one cell of the electrostatic precipitator, and to control the electrical switching of the at least one cell of the electrostatic precipitator by switching it off during one first pre-determined period.

The result is that during at least one first pre-determined period of the drying mode, the control system is configured to drive a flow of hot air from the roasting apparatus through the cell positioned inside the electrostatic precipitator while the cell is switched off.

Preferably, in the drying mode, the control system is configured to implement the following steps while driving a flow of hot air from the roasting apparatus through the cell:

S1—keeping the at least one cell of the electrostatic precipitator switched off during the first pre-determined period, then S2—at the end of the first pre-determined period, electrically switching on said cell, and if short-circuit is detected during a second pre-determined period, implementing steps S1 and S2 again, if no short-circuit is detected during the second pre-determined period, finishing the operation of passing air through the cell.

If the electrostatic precipitator comprises several cells then, during step S2, the control system is configured to switch on successively each cell in parallel or in series in order to detect short circuit on at least one cell.

In one embodiment, the control system is configured to implement the following steps while driving a flow of hot air from the roasting apparatus through the cell:

if no short-circuit is detected during step S2, an intermediate checking step S3 is implemented before finishing the operation of passing air through the cell, wherein during said intermediate checking step S3 hot air is passed through the cell of the electrostatic precipitator while said cell is switched on, and if at least one short-circuit is detected during step S3, steps S1 and/or S2 are implemented again.

Preferably, during the step of finishing the operation of the drying mode, the control system is configured to deactivate the heating device of the roasting apparatus and to actuate the smoke driver of the smoke treating unit in order to pass cooling air through the at least one cell.

Accordingly, during the step of finishing, deactivating the heating device enables the decrease of the temperature of the smoke treating unit globally and of the coffee roasting apparatus so that both can be ready for roasting and filtering operations.

Preferably the smoke treating unit can comprise an air inlet configured to introduce ambient air inside the smoke filtering sub-unit.

In one embodiment of the system, the smoke treating unit comprises an active carbon filter and the control system of the system is configured to operate the heating device of the roasting apparatus and the smoke driver of the smoke treating unit to maintain the temperature of the active carbon filter at at most 65° C.

Preferably, the time length of the operation of drying the cell of the electrostatic precipitator and the temperature of the hot air during said operation are set to avoid too high temperature in the roasting apparatus.

This temperature range avoids overheating of the roasting apparatus and enables fast cooling of the roasting apparatus, for example in less than 3 minutes.

In a third aspect, there is provided a computer program comprising instructions which, when executed by a computer, processor or control unit, cause the computer, processor or control unit to perform the method to dry such as described above.

In a third aspect, there is provided a computer readable storage medium comprising instructions which, when executed by a computer, processor or control unit cause the computer, processor or control unit (30) to carry out the method to dry such as described above.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

Specific embodiments of the invention are now described further, by way of example, with reference to the following drawings in which.

DETAILED DESCRIPTION OF EXEMPLARY EMBODIMENTS

System for Roasting and Filtering

Figure 1:
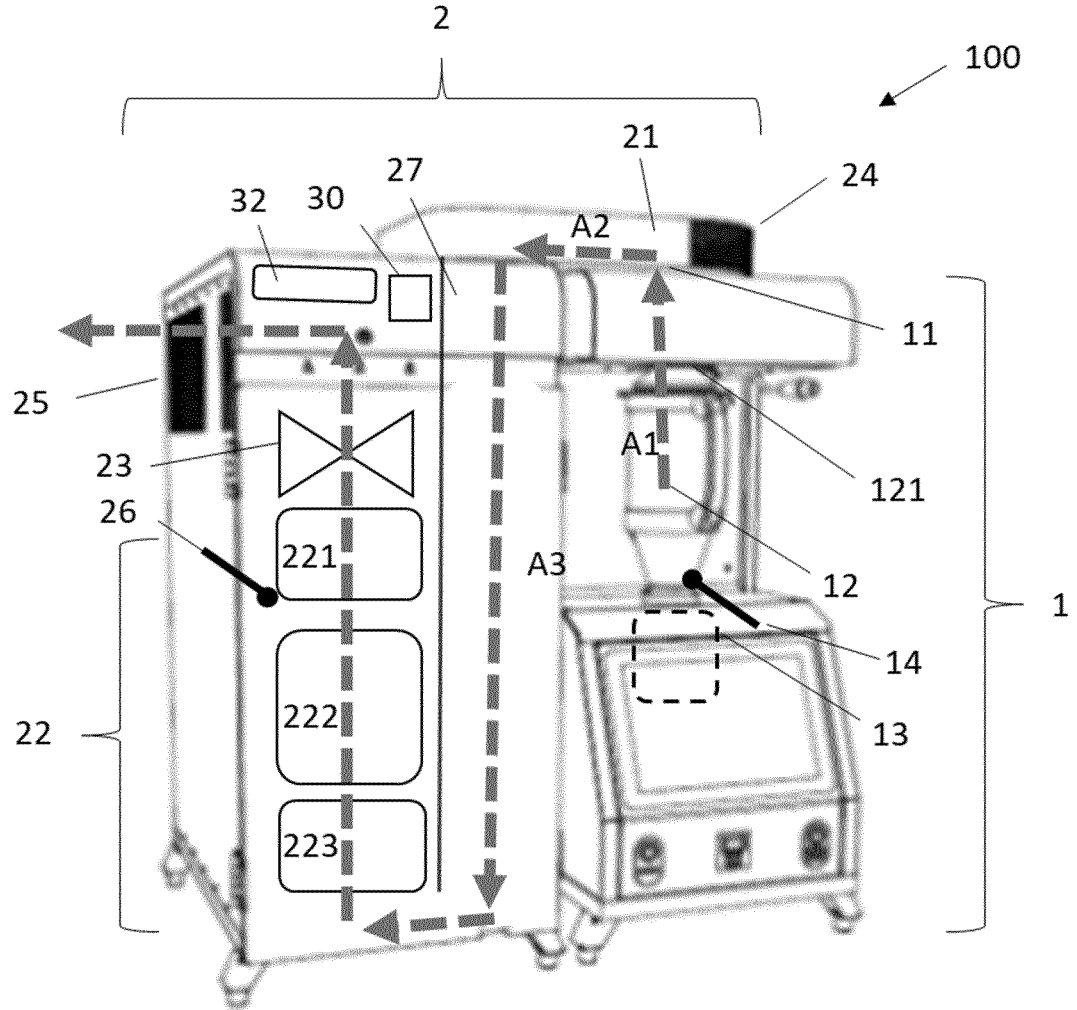
FIG. 1 is a view of a system of a roasting apparatus and a smoke treating unit illustrating the path of the smoke or of hot air through the system.
Figure 2:
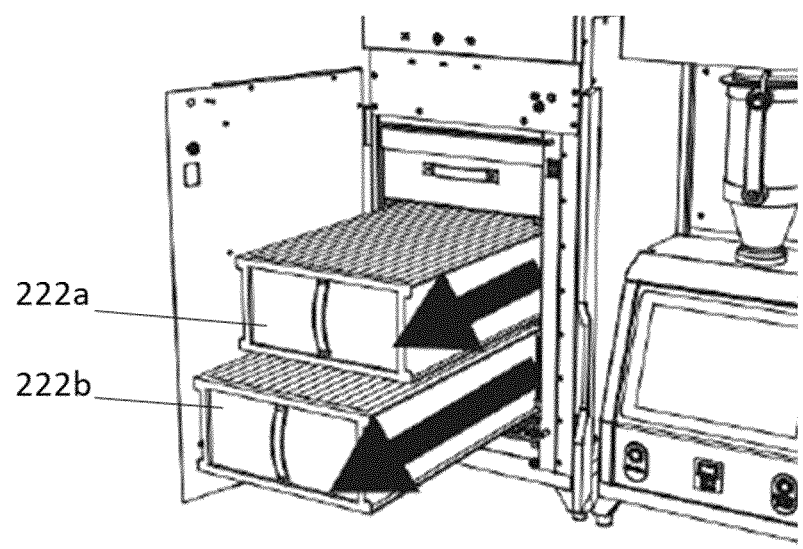
FIG. 2 is a view illustrating the removal of two cells of the electrical precipitator from the smoke treating unit.

FIGS. 1 and 2 show an illustrative view of a system of a roasting apparatus 1 and a smoke treating unit 2. Functionally, the roasting apparatus is operable to roast coffee beans and the smoke treating unit is operable to treat the smoke generated during roasting by the roasting apparatus.

Roasting Apparatus

The roasting apparatus 1 is operable to receive and roast coffee beans inside a roasting chamber 12.

Preferably, the roasting apparatus 1 comprises a roasting chamber 12 in which a flow of hot air is introduced to agitate and heat the beans. The hot air flow is usually produced by a heating device 13, usually comprising an air flow driver and a heater. These devices are positioned below the roasting chamber and introduce the flow of hot air through the bottom of the chamber. In the illustrated figure, the bottom of the chamber is configured to enable air to pass through, specifically it can be a perforated plate on which the beans can lie and through which air can flow upwardly.

The air flow driver is operable to generate a flow of air upwardly in direction of the bottom of the vessel. The generated flow is configured to heat the beans and to agitate and lift the beans. As a result, the beans are homogenously heated. Specifically, the air flow driver can be a fan powered by a motor. Air inlets can be provided inside the base of the housing in order to feed air inside the housing, the air flow driver blowing this air in direction of the chamber 12.

The heater is operable to heat the flow of air generated by the air flow driver. Preferably, the heater is an electrical resistance positioned between the fan and the perforated plate with the result that the flow of air is heated before it enters the chamber 12 to heat and to lift the beans.

The heater and/or the fan are operable to apply a roasting profile to the beans, this roasting profile being defined as a curve of temperature against time.

The roasting of the beans generates a smoke that is driven to the top opening 121 of the roasting chamber due to the flow of air generated by the air flow driver and as illustrated by arrow S1 in FIG. 1.

Generally a chaff collector is in flow communication with the top opening 121 of the chamber to receive chaffs that have progressively separated from the beans during roasting and due to their light density are blown off to the chaff collector.

The rest of the smoke is evacuated through the smoke outlet 11 at the top of the roasting apparatus.

Smoke Treating Unit

The smoke treating unit 2 is operable to receive and treat the smoke A1 emitted at the smoke outlet 11 of the roasting apparatus.

First, the smoke treating unit 2 comprises a smoke collecting device 21 adapted to collect the smoke or hot air produced by the roasting apparatus. This smoke collecting device 21 is particularly illustrated in the exploded view of FIG. 2: the collecting device forms an internal void space guiding the smoke or air (dotted lines A1, A2, A3) from the outlet 11 of the roasting apparatus in direction of the smoke filtering sub-unit 22. In FIG. 2, it can be appreciated that the bottom part of the smoke collecting device comprises a hole 211 designed to cooperate in a loose manner with the smoke outlet 11 of the roasting apparatus, the hole 211 being quite larger than the cross section of the smoke outlet end of the roasting apparatus. Generally, the bottom part of the smoke collecting device is simply put above the top of the roasting unit without any fixing means. This is particularly practical when the roasting unit 1 and the smoke treating unit 2 are two separated module. The smoke treating unit 2 can be easily connected or disconnected from any roasting apparatus.

The collecting device comprises a smoke outlet 212 cooperating with a guiding duct 27 conducting the smoke to the second part of the smoke treating unit that is the smoke filtering sub-unit 22. In the illustrated embodiment, the guiding duct 27 is designed to bring the smoke or air downwards in order to pass through the different filtering device from the bottom to the top. Yet, in other non-illustrated embodiments, the guiding duct can be designed to guide the smoke to pass through the different filtering devices from the top to the bottom.

In the illustrated embodiment, the smoke filtering sub-unit 22 is positioned close and aside the roasting apparatus.

Figure 3:
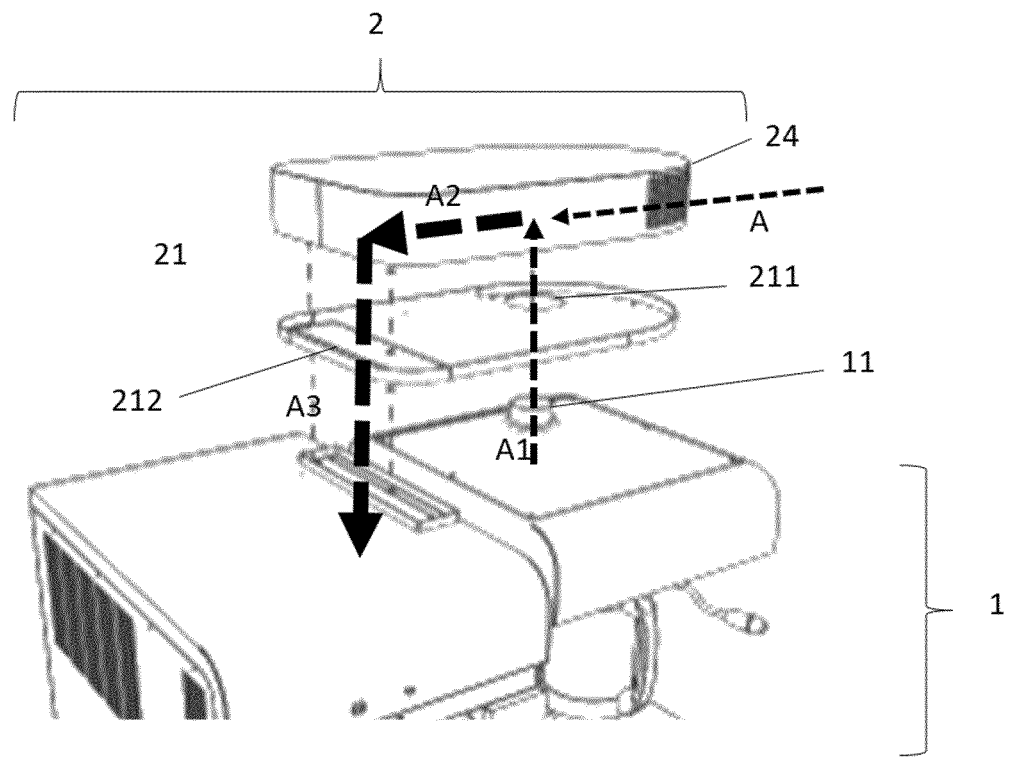
FIG. 3 is a detailed view of the collecting device and the air inlet of the system of FIG. 1.

Secondly, the smoke filtering sub-unit 22 comprises an electrostatic precipitator 222 adapted for filtering small particulate matter $PM_{2.5}$. As illustrated in FIG. 3, the electrostatic precipitator comprises two cells 222a, 222b that can be removed from the smoke filtering unit for cleaning. Once washed with water and drained, they can be put back inside the smoke treating unit and the drying method can be implemented.

In this particular illustrated embodiment, the smoke filtering sub-unit 22 comprises also:

an active carbon filter 221 adapted to remove VOCs from the smoke, other filters for particulate matter such as a device 223 adapted for filtering large particulate matter $PM_{10}$ (for example HEPA filter, metallic filter, paper filter).

Preferably, the devices for removing particulate matters are positioned upstream the active carbon filter. This upstream position guarantees that particulate matter do not foul the active carbon filter.

Physically, the electrostatic precipitator is positioned below the active carbon filter to avoid that particulates fall from the electrostatic precipitator on the active carbon filter when the electrostatic precipitator is switched off.

Thirdly, the smoke filtering sub-unit 22 comprises a smoke driver 23, generally a fan, for sucking the contaminated smoke or hot air from the inlet 211 of the collecting device through the smoke filtering sub-unit 22, where it is passed, to the outlet 25 of the smoke filtering sub-unit 22, where it is dispensed in ambient atmosphere.

Control System of System

Figure 4:
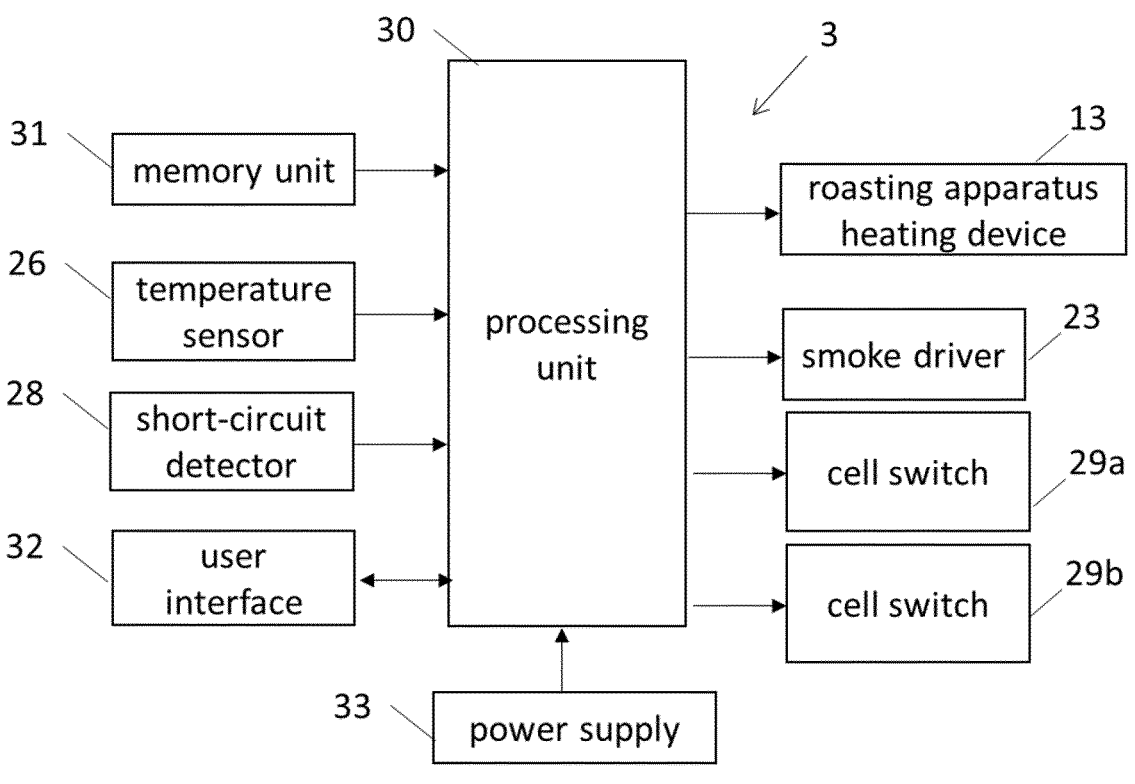
FIG. 4 is a block diagram of the controller of a system according to the invention.

With reference to FIGS. 1, 3 and 4, the control system 3 will now be considered: the control system 3 is operable to control the components of the roasting apparatus 1 and smoke treating unit 2 to dry the pairs of cell 222a, 222b. The control system 3 typically comprises: a user interface 32, a processing unit 30, a temperature sensor 26, a power supply 33, a memory 31.

The control system of the smoke treating unit 2 can be independent (when used in a manual mode) from the control system of the roasting apparatus or preferably, the control system of the smoke treating unit 2 can be connected to the control system of the roasting apparatus, the control system of the roasting apparatus being the master and the control system of the smoke treating unit being the slave.

The user interface 32 comprises hardware to enable an end user to interface with the processor 30 and hence is operatively connected thereto. More particularly: the user interface receives commands from a user; a user interface signal transfers the said commands to the processor 30 as an input. The commands may, for example, be an instruction to execute a drying process. The hardware of the user interface 32 may comprise any suitable device(s), for example, the hardware comprises one or more of the following: buttons, such as a joystick button or press button, joystick, LEDs, graphic or character LDCs, graphical screen with touch sensing and/or screen edge buttons.

When the control system of the smoke treating unit is the slave of the control system of the roasting apparatus, the user interface of the roasting apparatus can be used as the common interface of both apparatuses, input and output for the smoke treating unit being managed from that common interface. For example, progress about the process of drying of the smoke treating unit can appear on the user interface of the roasting apparatus.

Sensor 26 is operatively connected to the processor 30 to provide an input for monitoring the drying process. In particular, the sensor 26 provides the controller with input about the temperature upstream the active carbon filter 221. Other optional sensors may be implemented like VOC or PM detection sensors to detect malfunction during the drying mode, for example, presence of coffee beans inside the chamber of roasting apparatus.

The processor 30 generally comprises memory, input and output system components, which are arranged as an integrated circuit, typically as a microprocessor or a microcontroller. The processor 30 may comprise other suitable integrated circuits, such as: an ASIC, a programmable logic device such as an FPGA, an analogue integrated circuit such as a controller. The processor 30 may also comprise one or more of the aforementioned integrated circuits, i.e. multiple processors.

The power supply 33 is operable to supply electrical energy to at least the processor 30, any filtering device requiring power like the electrostatic precipitator and its pairs of cells 222a, 222b, the smoke driver 23 and the heating device of the roasting apparatus.

The memory unit 31 is generally configured for storage of the program code and optionally data. In particular, the program code encodes a drying process. The memory unit typically comprises: a non-volatile memory e.g. EPROM, EEPROM or Flash for program code and operating parameter storage, volatile memory (RAM) for data storage. The memory unit 31 may comprise separate and/or integrated (e.g. on a die of the processor) memory. For programmable logic devices the instructions can be stored as programmed logic.

In particular, the instructions stored on the memory unit 19 can be idealised as comprising a program of the drying process of the cells of the electrostatic precipitator.

The control system 3 is operable to apply this drying process program by controlling the heating device 13 of the roasting apparatus, the smoke driver of 23 of the smoke treating unit and the switches 29a, 29b of the cell of the electrostatic precipitator based on the detector 28 of short-circuits and optionally the temperature sensor 26.

The program can effect control of said components using extraction information encoded on a code and and/or other information that may be stored as data on the memory unit 19 and/or input via the user interface 20 and/or signal of the detector 28 of short-circuits and optionally the temperature sensor 26.

In particular, the control system 3 is configured to produce hot air in the roasting apparatus and drive this hot air through the pairs of cell of the electrostatic precipitator while keeping these cells switched off until the cells are dried and no humidity creates short-circuits in the cells.

The processing unit 30 is operable to:

receive an input from the user interface 32 that drying of the cells 222a, 222b of the electrostatic precipitator positioned inside the electrostatic precipitator is requested, process the input according to the smoke treating program code (or programmed logic) stored on the memory unit 31, provide an output, which comprises the control of the heating device 13 of the roasting apparatus, of the smoke driver 23 and of the switches 29a, 29b of the cells of the electrostatic precipitator.

In particular, the output consists in:

in a first step S1, actuating the heating device 13 of the roasting apparatus to generate hot air and actuating the smoke driver 23 to pass this flow of hot air through the cells 222a, 222b, while keeping the cell of the electrostatic precipitator switched off, during a first pre-determined period, in a second step S2, at the end of the pre-determined period, electrically switching on the cell 222a and detecting any short-circuit, and then electrically switching on the cell 222b and detecting any short-circuit, then if at short-circuit is detected, implementing steps S1 and S2 again, and if no short-circuit is detected, finishing the operation of passing air through the cells.

In a preferred embodiment, the drying process comprises a control of the temperature inside the smoke treating unit, in particular if this unit comprises an active carbon filter 221 such as illustrated in FIG. 1. In that preferred embodiment, in addition to the above mentioned steps, the processing unit 30 can be operable to:

receive an input of the temperature sensor 26, process the input according to smoke treating program code (or programmed logic) stored on the memory unit 31, provide an output, which comprises the control of the smoke driver 23. The process is more preferably executed with closed-loop control using the input signal from the temperature sensor 26 as feedback. In that step, the processing unit can control the heating device of the roasting apparatus too, e.g. decrease the power of the heater.

If the temperature becomes too high, the speed of the fan of the smoke driver 23 is increased to introduce a more important volume of ambient air A at the air inlet 24 and to mix more ambient air with the hot air A1 with the effect of decreasing the temperature of the flow of hot air A2.

Alternatively, if the temperature becomes too low, the speed of the fan of the smoke driver 23 is decreased to introduce a less important volume of ambient air A at the air inlet 24 and to mix less air with the hot air A1 with the effect of increasing the temperature of the hot air A2 passed through the smoke filtering sub-unit 22.

With the system such as illustrated in the figures, the drying method was implemented with the roasting apparatus producing hot air at 200° C., the smoke driver driving hot air to get a temperature of about 60° C. downstream the electrostatic precipitator 222 the step S1 happening until a first pre-determined period of 5 minutes, the step S2 happening during a pre-determined period of 5 seconds, the checking step S3 happening during a pre-determined checking period of 2 minute.

Depending on the state of wetting of the cells, drying was reached in 10 to 30 minutes.

The method of the present invention presents the advantage of enabling the cleaning of the smoke treating unit of a roasting apparatus very rapidly, decreasing the non-operational state of the smoke treating unit from several hours to less than half an hour.

In addition the method enables the drying of other filters part of the smoke treating unit simultaneously.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

| List of references in the drawings: | |
| --- | --- |
| roasting apparatus | 1 |
| smoke outlet | 11 |
| roasting chamber | 12 |
| top outlet | 121 |
| heating device | 13 |
| temperature sensor | 14 |
| smoke treating unit | 2 |
| smoke collecting device | 21 |
| smoke inlet | 211 |
| smoke outlet | 212 |
| smoke filtering sub-unit | 22 |
| active carbon filter | 221 |
| electrostatic precipitator | 222 |
| cells | 222a, 222b |
| PM filter | 223 |
| smoke driver | 23 |
| air inlet | 24 |
| outlet | 25 |
| temperature sensor | 26 |
| guiding duct | 27 |
| short-circuit detector | 28 |
| switch of cell | 29a, 29b |
| controller | 3 |
| processing unit | 30 |
| memory unit | 31 |
| user interface | 32 |
| power supply | 33 |
| system | 100 |

The invention claimed is:

1. A method to dry at least one wet removable cell of an electrostatic precipitation smoke filter of a smoke treating unit of a roasting system, the system comprising:

a roasting apparatus, a smoke treating unit configured to treat the smoke produced by the roasting apparatus, the smoke treating unit comprising the electrostatic precipitation smoke filter, the electrostatic precipitation smoke filter comprising the at least one wet removable cell, the at least one wet removable cell comprising ionization wires, collecting electrodes and repelling electrodes, the wires and electrodes being supplied with an electrical power, wherein the method comprises at least the step of passing hot air through the at least wet removable cell, while the at least one wet removable cell is positioned inside the electrostatic precipitator and while the at least one wet removable cell is switched off, and wherein the hot air is generated by the roasting apparatus while the roasting chamber of the apparatus is empty, in particular void of coffee beans.

2. The method according to claim 1 wherein, while passing the hot air through the at least one cell of the electrostatic precipitator, the method comprises the steps of:

S1—keeping the at least one cell of the electrostatic precipitator switched off during one first pre-determined period, then S2—at the end of the first pre-determined period, electrically switching on the at least one wet removable cell, and if short-circuit is detected during a second pre-determined period, implementing steps S1 and S2 again, if no short-circuit is detected during the second pre-determined period, finishing the operation of passing cooling air through the cell.

3. The method according to claim 2, wherein:

if no short-circuit is detected during step S2, an intermediate checking step S3 is implemented before finishing the operation of passing the cooling air through the at least one wet removable cell, wherein during the intermediate checking step S3 the hot air is passed through the at least one wet removable cell of the electrostatic precipitator while the at least one wet removable cell is switched on, and if short-circuit is detected during step S3, steps S1 and S2 are implemented again.

4. The method according to claim 2, wherein the step of finishing the operation of passing hot air through the at least one wet removable cell comprises the step of passing cooling air through the at least one wet removable cell.

5. The method according to claim 1, wherein the electrostatic precipitator comprises several cells and, during step S2, each of the at least one wet removable cell is successively switched on in order to detect short circuit on the at least one wet removable cell.

6. The method according to claim 1 wherein the smoke treating unit comprises an active carbon filter and/or at least one metallic mesh filter.

7. The method according to claim 1 wherein:

the smoke treating unit comprises an active carbon filter, and the hot air is passed through the at least one wet removable cell while keeping the temperature of the active carbon filter at most 65° C.

8. A computer program comprising instructions which, when executed by a computer, processor or control unit, cause the computer, processor or control unit to perform the method to dry at least one wet removable cell of an electrostatic precipitation smoke filter of a smoke treating unit of a roasting system, the system comprising:

a roasting apparatus, a smoke treating unit configured to treat the smoke produced by the roasting apparatus, the smoke treating unit comprising the electrostatic precipitation smoke filter, the electrostatic precipitation smoke filter comprising the at least one wet removable cell, the at least one removable cell comprising ionization wires, collecting electrodes and repelling electrodes, the wires and electrodes being supplied with an electrical power, wherein the method comprises at least the step of passing hot air through the at least one wet removable cell, while the at least one wet removable cell is positioned inside the electrostatic precipitator and while the at least one wet removable cell is switched off, and wherein the hot air is generated by the roasting apparatus while the roasting chamber of the roasting apparatus is empty, in particular void of coffee beans.

* * * * *